Nov. 12, 1935.   G. T. HUXFORD ET AL   2,021,066
MACHINE TOOL
Filed June 13, 1931   7 Sheets-Sheet 1

Inventors
George T. Huxford
Frank E. Stratton
Paul G. Heinemann
BY
Thomas A. Jenckes
ATTORNEY Nov. 12, 1935.  G. T. HUXFORD ET AL  2,021,066
MACHINE TOOL
Filed June 13, 1931   7 Sheets-Sheet 3
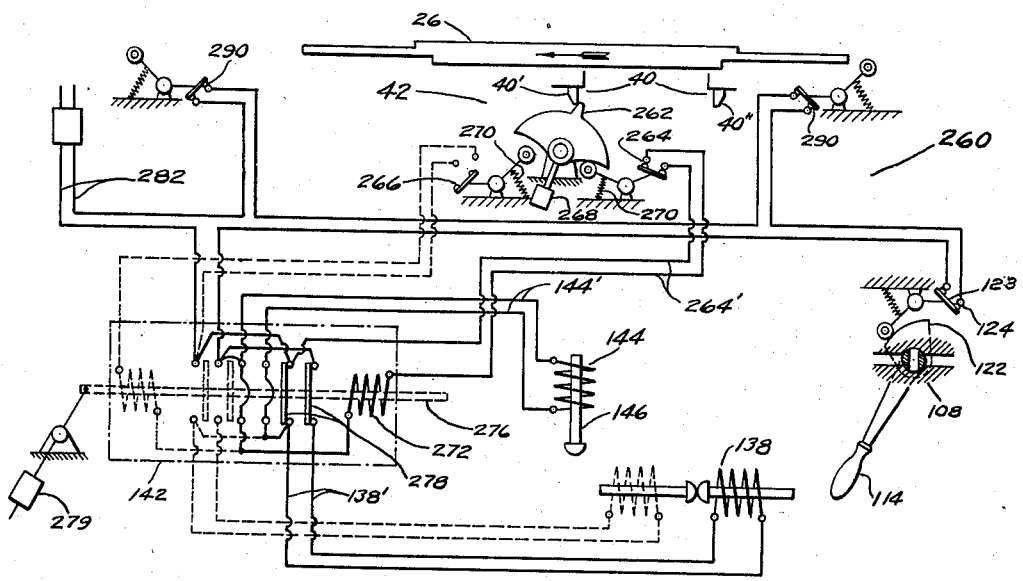
_Fig. 3_
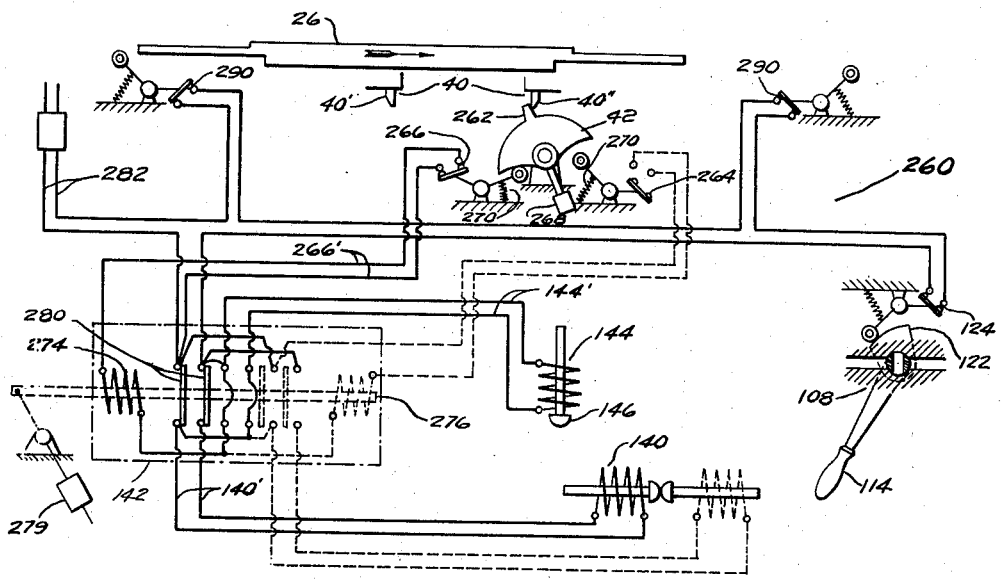
_Fig. 4_
Inventors
George T. Huxford
Frank E. Stratton
Paul G. Heinemann
BY Thomas A. Jenckes
ATTORNEY

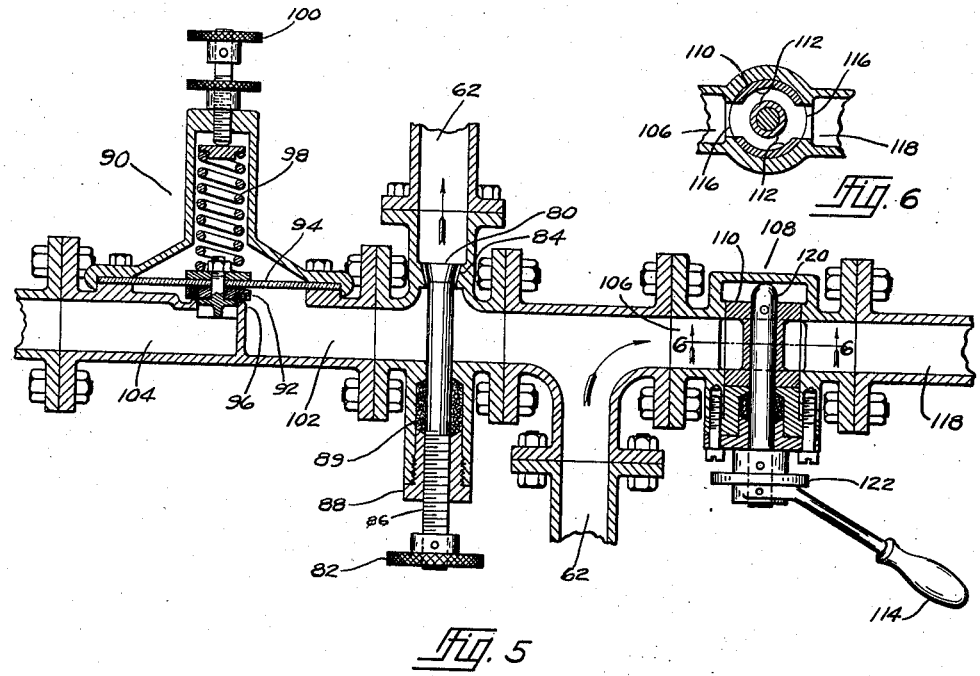
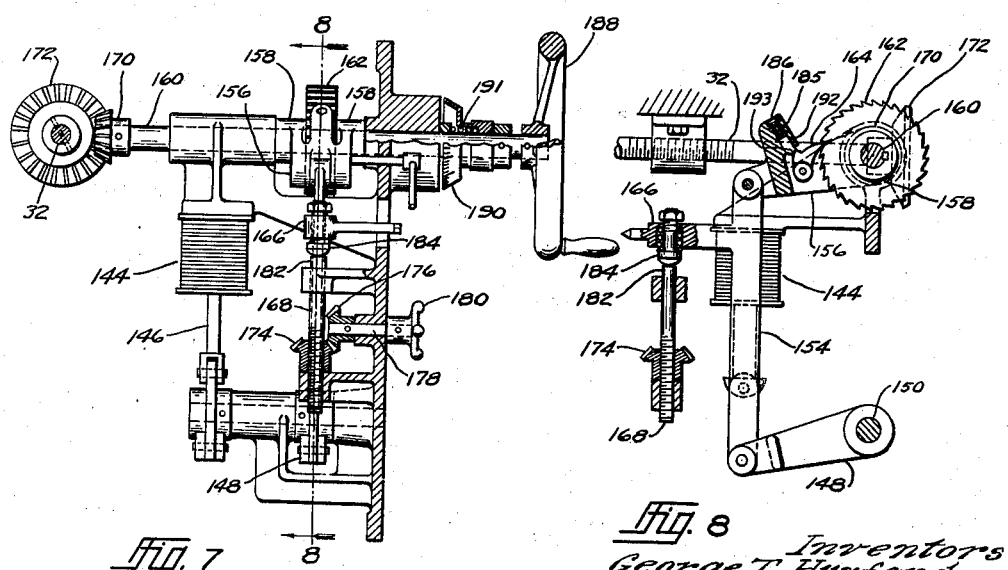

Nov. 12, 1935.　　　G. T. HUXFORD ET AL　　　2,021,066
MACHINE TOOL
Filed June 13, 1931　　　7 Sheets-Sheet 5

Inventors
George T. Huxford
Frank E. Stratton
Paul G. Heinemann
BY Thomas A. Jenks
ATTORNEY

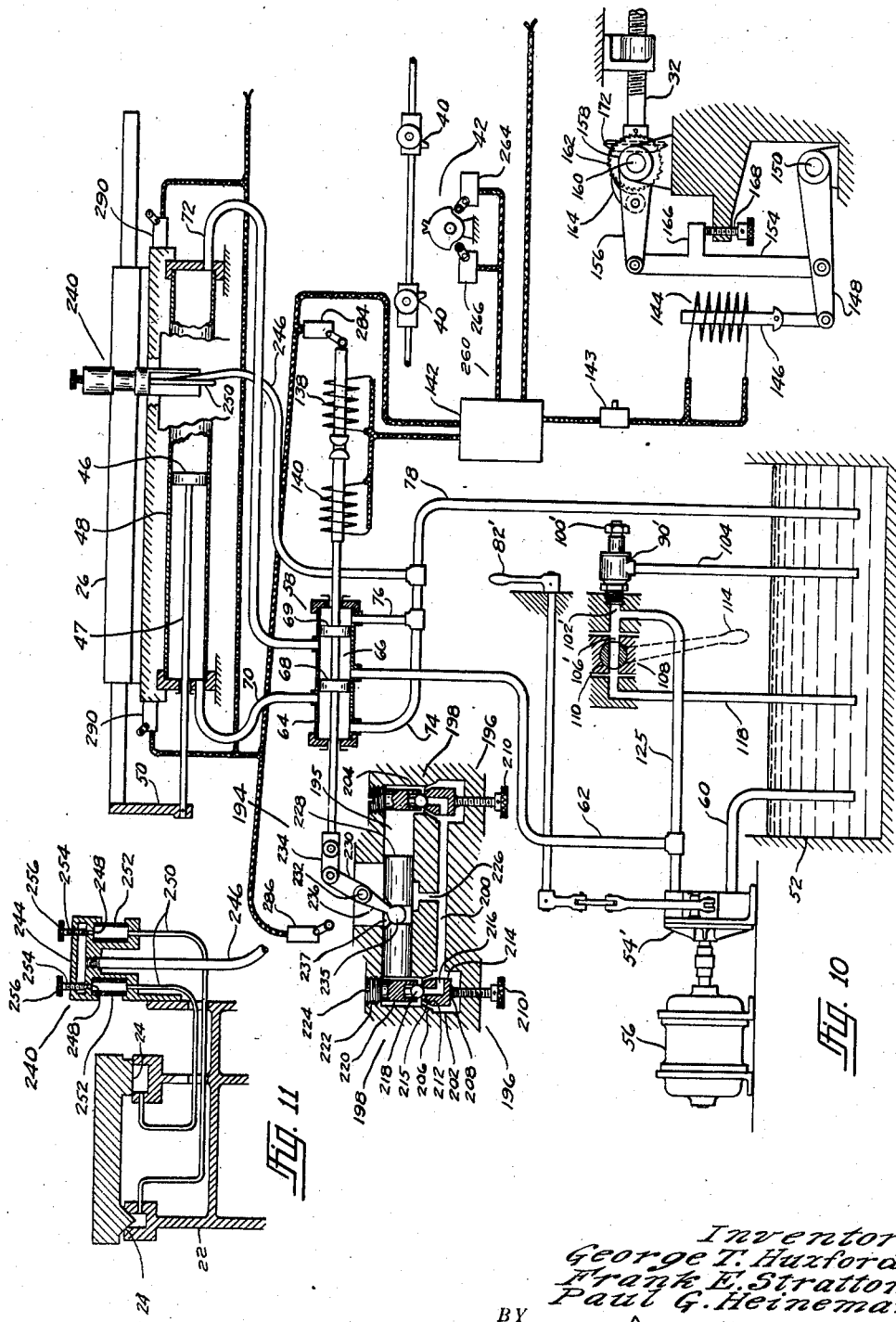

Nov. 12, 1935.    G. T. HUXFORD ET AL    2,021,066
MACHINE TOOL
Filed June 13, 1931    7 Sheets-Sheet 7
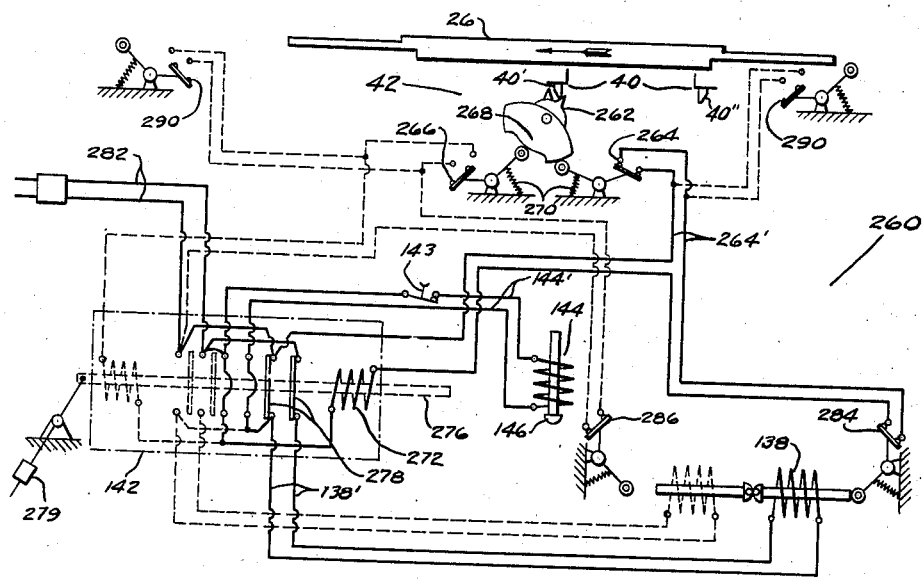
_Fig._ 12
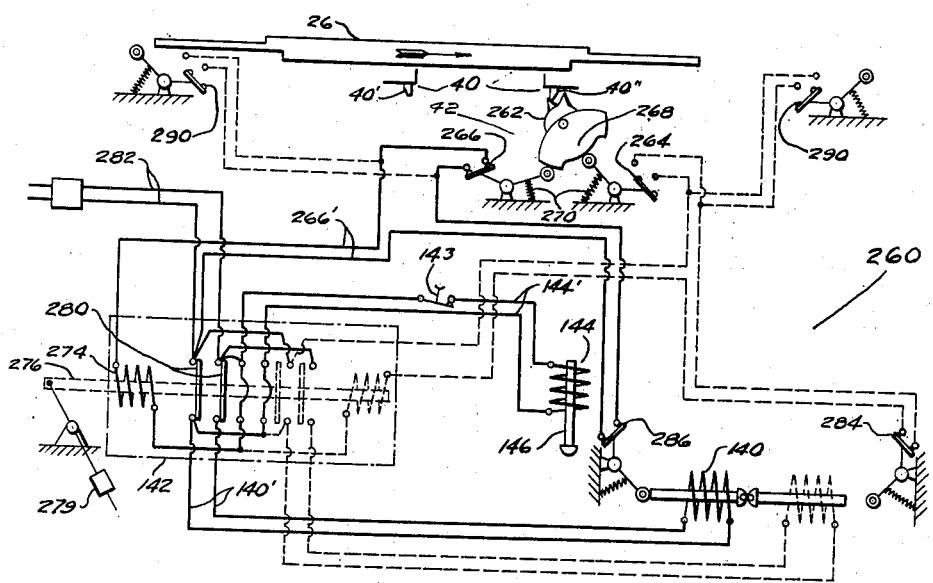
_Fig._ 13
Inventors
George T. Huxford
Frank E. Stratton
Paul G. Heinemann
BY Thomas A. Jenckes
ATTORNEY Patented Nov. 12, 1935

2,021,066

UNITED STATES PATENT OFFICE 2,021,066

MACHINE TOOL

George T. Huxford, Providence, Frank E. Stratton, Cranston, and Paul G. Heinemann, Providence, R. I., assignors to Diamond Machine Co., Providence, R. I., a corporation of Rhode Island Application June 13, 1931, Serial No. 544,122

16 Claims. (Cl. 51—92)

Our invention relates to improvements in grinding machines or similar types of machine tools.

Our invention includes a mixed electric and hydraulic system for feeding the work and tool thereof the desired amounts relative to each other for the grinding operation. Our invention includes a table for holding the work, a fluid system including fluid operated means for reciprocating the table which preferably includes a cylinder with suitable pistons, a pump, preferably a uni-directional pump for supplying fluid to said means and preferably a movable valve controlling the flow of fluid in said system operable to change the direction of circulation of fluid in said system to alternately move said table in opposite directions, said means usually preferably including a slidable double acting double piston valve. We also preferably employ means to vary the speed of fluid flow which in one embodiment of our invention comprises an adjustable valve to regulate the feed of fluid from the pipe in the system and in another embodiment of our invention comprises an adjustment to the pump to regulate the flow of fluid therefrom. We also preferably provide a pressure relief valve which functions as a safety valve to release an excess pressure in said system for any reason and a manually controlled bypass for interrupting the flow of fluid through said system to stop said table at any desired portion of its reciprocation cycle. Our invention specifically relates to improvements in the electrical system for actuating said valve or other reciprocating means to change the flow of fluid through the system and for this purpose we preferably extend the piston of the valve and have it alternately drawn in opposite directions by two oppositely disposed solenoids or other electrical means and we also provide means preferably comprising a novel type of adjustable dashpot also preferably directly attached to said valve piston to cushion the valve at the end of the strokes and said cushioning means or dashpot is preferably made adjustable in order to vary the time interval between the strokes of table reciprocation, namely, the drag dwell or delay at the end of the table's strokes. The usual tool is preferably mounted on said machine independently of the table to contact the reciprocating work. Any suitable type of means may be provided to actuate the tool, but in our preferred embodiment we preferably provide a type of means including a pawl and ratchet for feeding the tool substantially at right angles to the reciprocating work predetermined amounts relatively to the work and we preferably also employ a solenoid or other electrical means for actuating this type of mechanical means, the solenoid moving the pawl to actuate the ratchet to feed the tool the desired amount. An electric circuit for actuating said table reciprocation actuating solenoids and said tool feeding solenoid is provided and we preferably include in said circuit a magnetic switch for alternately operating the valve actuating solenoids and simultaneously therewith actuating the tool feeding solenoid. We provide switch means automatically actuated by the table to actuate the magnetic switch to actuate the proper slidable valve solenoid and actuate said tool solenoid substantially at the end of each table stroke. In our preferred embodiment the switch means automatically actuated by the table completes the circuit to simultaneously actuate the magnetic switch to actuate the slidable valve solenoid and the tool solenoid at substantially the ends of the strokes and we also provide switch means actuated by the valve or other reciprocating means employed at substantially the completion of its change of position to break said circuit, thereby insuring that there will be enough electricity to complete the desired feeding of the tool and the change in valve position until such change has actually taken place and when the transition is accomplished that there will be no electricity in the circuit to burn out the solenoids or otherwise impair the electric systems.

One important feature of our invention resides in the means we employ for breaking the circuit to cut off all current preferably to change the position of the valve in case for any reason the table should reciprocate more than its desired normal stroke, said means comprising limit switches in the electrical circuit adapted to break said circuit to stop said movement at a place beyond the normal path of movement of said reciprocating table.

A further feature of our invention relates to the improved type of automatic oiler we employ for oiling the table ways fed from the hydraulic source of supply.

These and such other objects of our invention as may hereinafter appear will be best understood from a description of the embodiments thereof shown in the accompanying drawings.

In the drawings, Fig. 1 is a perspective view of a grinding machine constructed in accordance with our invention.

Fig. 3 is a diagrammatic view of the connections for the electric system in one position of the table.

Fig. 4 is a diagrammatic view of the connections for the electric system in another position of the table.

Fig. 5 is an enlarged sectional view of the pressure relief valve, adjustable fluid flow regulating valve and bypass valve we employ in the embodiment of our invention shown in Fig. 1.

Fig. 6 is a sectional view taken along the line 6—6 of Fig. 5.

Fig. 7 is a plan view partially shown in section of the tool advancing means and its connected solenoid.

Fig. 8 is a cross-sectional view taken along the line 8—8 of Fig. 7.

Fig. 10 is a diagrammatic skeleton view of the operative parts thereof similar to Fig. 2.

Fig. 11 is a cross-sectional view taken through the table and ways to show the novel type of automatic oiler for the table ways we preferably employ.

Fig. 12 is a view of the electric circuit generally similar to Fig. 3 of the embodiment of our invention shown in Fig. 9 showing the table in one position.

Fig. 13 is a view of the electric circuit generally similar to Fig. 3, of the embodiment of our invention shown in Fig. 9 showing the table in another position.

Figure 1:
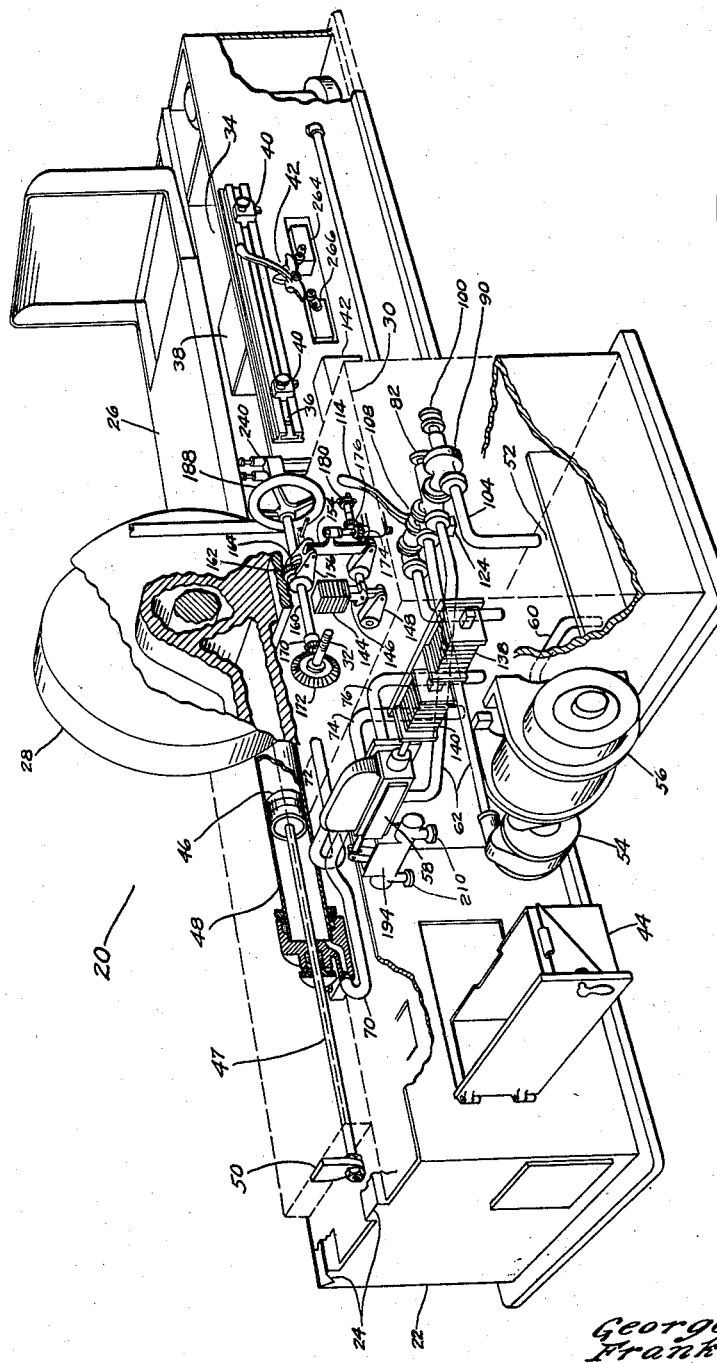

In the drawings, wherein like characters of reference indicate like parts throughout, 20 generally indicates a grinding machine constructed in accordance with our invention. We will first describe the embodiment of our invention shown in Figs. 1–8 and then note the points of difference between that embodiment of our invention and our preferred form of invention shown in Figs. 9–13. Said grinding machine 20 includes the usual frame 22 having the ways 24 on which the grinding wheel table or other reciprocatable means 26 is reciprocatably mounted as usual. In our preferred embodiment the grinding wheel or other tool employed 28 is preferably mounted on the forward extension 30 of said frame 22 in front of said reciprocating table 26. The grinding wheel 28 is provided with suitable means (not shown) for feeding it relative to the work, said means being actuated by the shaft 32. A water trough 34 normally extends longitudinally of the machine underneath the grinding wheel 28. The slide 36 reciprocates in front of the frame and is driven by the table 26 by the medium of reduction gearing 38 extending through the trough 34. It is obvious therefore that the slide 36 slides in front of the frame 22 and has the dogs 40 adjustable thereon so that they may be within the ready reach of the operative standing in front of the reciprocating slide 36 adjacent the grinding wheel 28 and that said dogs 40 may be readily adjusted by an operative without his moving the full length of the grinding machine, said feature forming the subject matter of a different application, Serial Number 536,539, filed May 11th, 1931 upon which Patent No. 1,899,362 was granted February 28, 1933, of Frank E. Stratton, one of the joint inventors herein. The dogs 40 actuate the tripping lever 42 which will be described in detail later. We preferably also employ the pivoted sediment tank 44 which is formed to strain the sediment from the coolant and is suitably pivoted at a point on the frame 22, so that it may be pivoted outwards for removal of sediment therefrom.

The table 26 in both the embodiments is driven by the piston 46 which reciprocates in the cylinder 48 and which is attached to a suitable lug 50 depending from one end of the table 26. The fluid system for reciprocating the table includes the reservoir 52 and the preferably uni-directional pump 54 suitably driven by the motor 56. The flow to the operating cylinder 48 is controlled by the slidable valve 58 interposed in said fluid system. The fluid is drawn from said reservoir 52 to said pump 54 by the connecting pipe 60 and it is discharged from said pump 54 through the medium of the valve inlet pipe 62. The slidable valve 58 includes the cylinder 64 and the piston 66 provided with the spaced pilot piston heads 68 and 69 therein. The valve inlet pipe 62 discharges substantially centrally of the cylinder 64. A pipe 72 discharges from a point approximately one-half the distance between the center and end of said cylinder 64 into one end of the operating cylinder 48 and another pipe 70 discharges from approximately the same point on the opposite side of said valve cylinder 64 to the opposite end of said operating cylinder 48. The valve cylinder 64 is provided with the discharge pipes 76 and 74 respectively near each end thereof which converge to a common discharge pipe 78 discharging into the reservoir 52. The piston 66 is automatically moved in a manner to be explained at the end of the table strokes.

Figure 2:
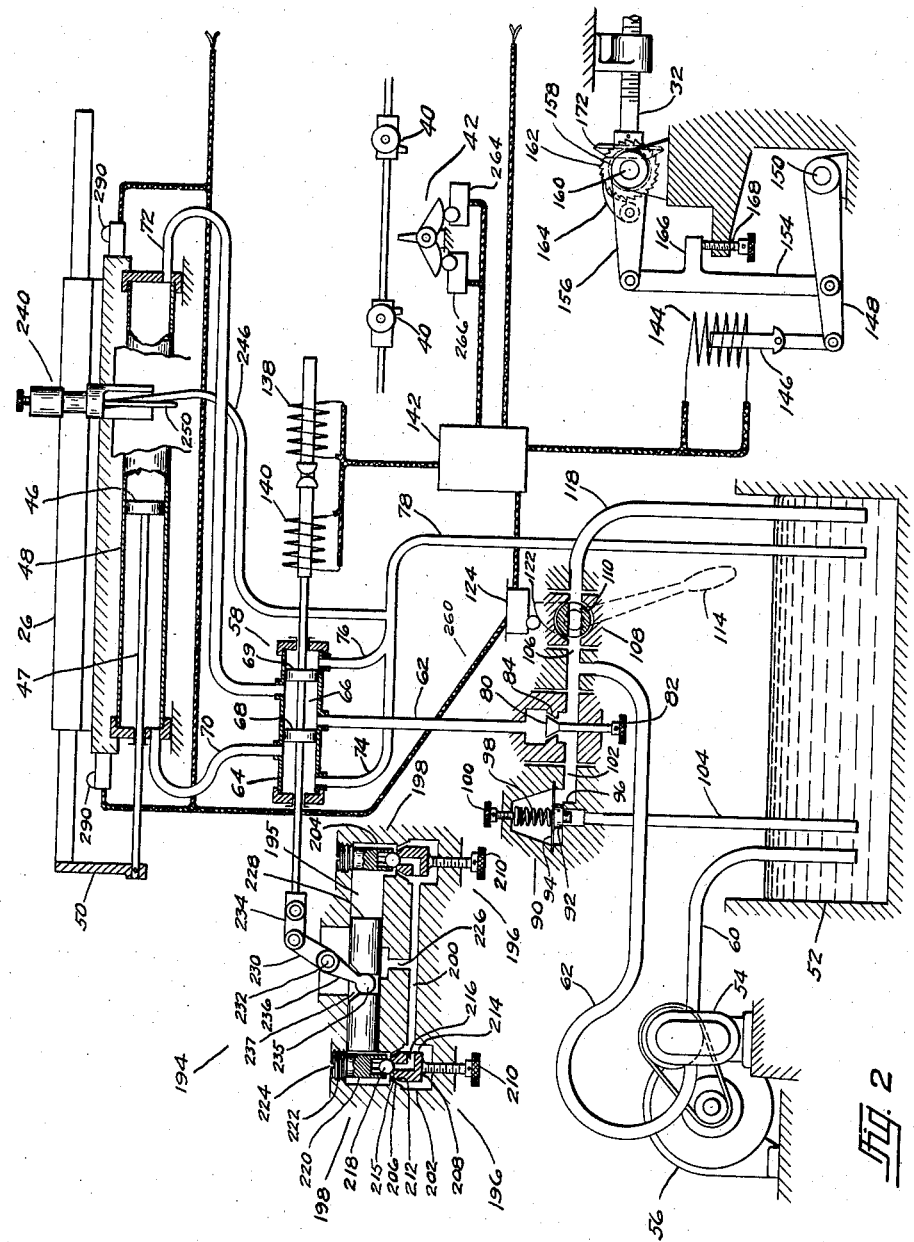
Fig. 2 is a diagrammatic skeleton view of the operative parts thereof.
Figure 9:
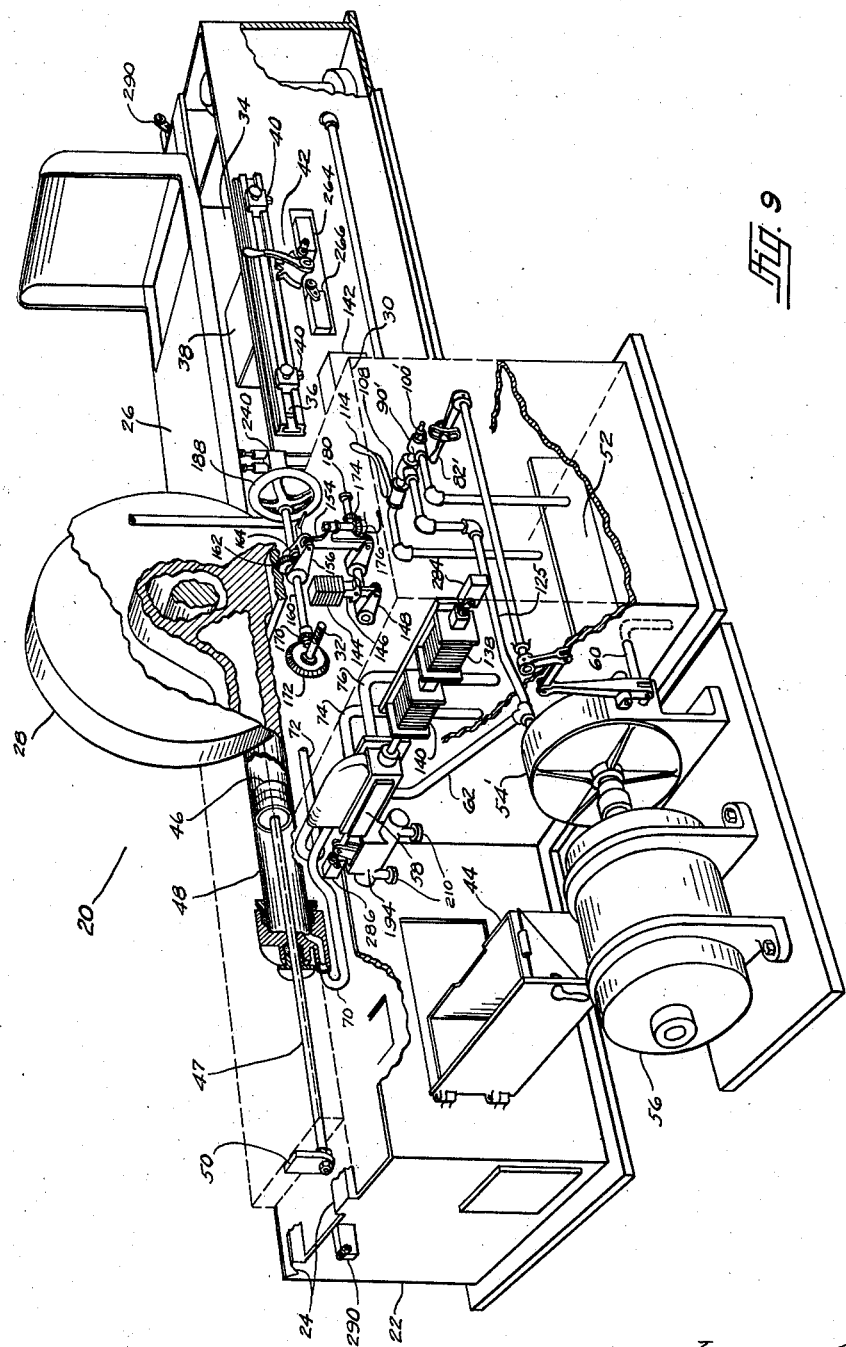
Fig. 9 is a perspective view of a grinding machine equipped with the preferred embodiment of our invention.

When in the position shown in Fig. 2 fluid flowing from the pump 54 is forced centrally into the valve cylinder 64 and due to the then position of the pilot piston heads 68 and 69 flows upwardly through the pipe 72 to force the piston head 46 in the cylinder 48 to the left and thereby automatically moving the table 26 to the left by the medium of its connection piston rod 47 and lug 50 thereto. It is thus obvious that as the piston head 46 is being forced to the left that fluid will be discharged from the cylinder 48 by the opposite side of said piston 46 through the pipe 70 into the left hand end of the pilot cylinder 64 and back through the discharge pipe 74 and through the pipe 78 to the reservoir 52. When the table 26 has completed its maximum movement to the left a dog 40 will trip the lever 42 to actuate the electrical system in a manner to be explained to move the piston 66 of the valve and hence the pilot piston heads 68 and 69 to the opposite position so that fluid will be discharged from the valve cylinder 64 through the pipe 70 into the left hand end of the operating cylinder 48 to force the piston head 46 and hence table 26 to the right and that fluid will discharge from said operating cylinder 48 through said pipe 72 and as the piston head 69 is moved over centrally of said valve cylinder 64 through the right hand end of the valve cylinder 64 out to the discharge pipe 76 and through the pipe 78 to the reservoir 52. It is thus obvious that the fluid system will operate to first push the table 26 to the left and at the end of the table stroke when the position of the valve piston heads 68 and 69 are changed will then operate to pull it to the right.

Our improved hydraulic system, however, also includes means to vary the speed of fluid flow through the system. In our preferred embodiment and as more particularly shown in Figs. 2 and 5 said means comprises an adjustable conical valve head 80 threadedly adjustable by means of the thumb screw 82 from outside of the machine relative to the cooperating downwardly tapering conical seat 84. It is thus obvious that when the thumb screw 82 is turned to raise the position of the valve head 80 relative to said valve seat 84 that more fluid will be admitted through the inlet pipe 62 to the valve cylinder 64. The valve head adjusting rod 86 is threadedly adjusted in a suitable gland 88 with packing 89 extending opposite said inlet pipe 62 (see Fig. 5). In case anything should be the matter with the fluid system we provide two bypasses from the inlet pipe directly back to the reservoir. One includes the pressure relief valve 90, comprising the valve head 92 normally held in position by the diaphragm 94 against the valve seat 96. A spring 98 normally urges said diaphragm 94 to urge said valve head 92 downwards against the valve seat 96 and the tension on the upper end of said spring 98 is made adjustable by the means of an adjusting thumb screw 100, also threadedly adjustable within an extension from said inlet pipe 62. It is obvious that when pressure in said system builds up greater than the pressure of the spring 98 against the diaphragm 94, that it will push the diaphragm 94 upwards thus raising the valve head 92 from its seat 96 and permitting the flow of fluid from the bypass 102 from said inlet pipe 62 through the now open valve 92—96 and back to the reservoir through the discharge pipe 104.

We also preferably provide a manually controlled bypass for interrupting the flow of fluid through said system to stop said table at any desired portion of its reciprocating cycle. Said bypass valve is also constructed to automatically cut off the current from the electrical system simultaneously with bypassing the fluid from the inlet back to the reservoir. In our preferred embodiment said bypass valve is constructed as follows. A bypass line 106 leads from said inlet pipe 62 to the bypass valve 108. As shown in Figs. 5 and 6 our preferred embodiment of bypass valve comprises a rotary valve head 110 provided with the sector shaped walls 112 which may be rotated to a position closing the bypass line 106, thereby permitting the fluid to normally flow through the system through the usual inlet 62 and which may be rotated by means of the handle 114 so that the open portion 116 of said rotary valve head 110 will be in a position to permit the flow of fluid through said bypass valve 108 and out through the discharge pipe 118 to the reservoir 52. The valve head 110 is mounted on the rod 120 to which the handle 114 is attached. Said rod 120 is preferably extended and has mounted thereon the cam 122 adapted on opening of said valve 108 to open the switch 124 to break the circuit in the electrical system 260 simultaneously with the bypassing of the fluid from the inlet line 62 back to the reservoir 52 through the pipe 106, valve 108, pipe 118. When the valve 108 is closed, the cam 122 moves to a position to permit the contact arm 123 to close the switch 124 to complete the circuit. The spring actuated contact arm 123 on removal of said cam 122 moves to a position to complete the circuit at all times when said arm 123 is not contacted by the cam 122.

The improved embodiment of our invention shown in Figs. 9 to 13 is provided with a slightly different embodiment of pressure relief valve 90' provided with the adjustable turning screw 100'. This, however, preferably has a hexagonal head so as to be turned by a member for the initial adjustment thereof. In this embodiment an extension 125 leads from the inlet pipe 62 and an extension 102' thereof leads to the relief valve 90' and discharge pipe 104 and an extension 106' thereof leads from said pipe 125 to said bypass stop valve 108 to the discharge pipe 118. In this embodiment the pump 54' itself is provided with means for controlling the rate of flow therethrough, said means being adjustable by means of the turning lever 82'. In all other respects the hydraulic systems in both embodiments are similar.

The electrical system includes the two opposite disposed solenoids 138 and 140, the solenoid 138 being operative to draw the valve piston rod 66 to the right to permit the table to be pulled to the left, and the solenoid 140 being operative to move the valve piston 66 to the left to permit the table to be pushed to the right. The solenoids 138 and 140 are controlled by the magnetic switch 142 which magnetic switch also controls the cross feed solenoid 144, which operates to feed the tool the desired amount forward at the end of each table stroke. Whenever the armature of the solenoid 144 is actuated it operates to raise the plunger 146 upwards. The plunger 146 is mounted on an arm 148 pivotally mounted at 150. Said arm 148 also has the rod 154 vertically mounted thereon and the upper end thereof is attached to an arm 156 which has on its opposite end the collar 158 surrounding the shaft 160 on which the ratchet 162 is mounted. The pawl 164 is pivotally mounted on the arm 156 in a manner to engage the ratchet teeth. Whenever a current flows through the solenoid 144, the plunger 146 is raised upward against the force of gravity, thereby simultaneously raising the horizontal arm 148, the vertical rod 154, the outer end of the arm 156 and correspondingly the pawl 164, so that the pawl 164 will engage in the ratchet teeth 162 to rotate the ratchet hence the shaft 160 the desired amount. When the solenoid 144 is deenergized it is obvious that the plunger 146, arm 148, rod 154, outer end of the arm 156 and pawl 164 will drop by gravity to a lowered position limited by the arm 166 projecting laterally from the vertical rod 154 abutting the upper end of the adjustable stop screw 168, the pawl 164 on its downward movement merely sliding lightly over the ratchet teeth 162. It is apparent that the throw of the number of ratchet teeth that the pawl will be jerked forward on each actuation of the solenoid may be adjustably varied by means of the adjusting screw 168. The shaft 160 drives the traversing shaft 32 through the medium of the connecting bevel gears 170 and 172. As shown in Figs. 1, 7 and 8 the stop screw 168 may have an adjusting nut therefor broken into two parts operating at right angles and connected by the bevel gears 174 and 176, the adjusting gear 176 on the rod 178 being adjusted by the turning handle 180 to vary the amount that the head 182 of the stop screw 168 projects upwardly to abut the arm 166 projecting laterally from said vertical rod 154. The portion of the arm 166 which abuts the upper end 182 of the stop screw 168 may comprise a rod 184 resiliently mounted thereon. The pawl 164 may be urged against the ratchet teeth by the spring device 186 shown in Fig. 8. It is also apparent that the tool may be traversed by the means of the operating wheel 188, also mounted on said shaft 160. The dial 190 is mounted around said shaft 160 and is continuously held against it to rotate therewith by means of the friction spring 191. It may, however, be adjusted relative thereto the spring 191 yielding for this purpose. It is also obvious that if it is desired to move the pawl 164 away from said ratchet teeth 162 that the pawl may be pivoted against the pressure of the spring 185 until the pointed end 192 engages the projection 193 on the pawl to hold the pawl in raised position. It is apparent that the pawl may again be brought into position to contact the ratchet teeth merely by pressing down on it to overcome the pressure in the spring 185 in the spring device 186.

As stated, we provide cushioning means for the slidable valve 58 preferably adjustable to vary the dwell between movements of the reciprocatable means in opposite directions. In our preferred embodiment said cushioning means 194 is directly attached to the valve piston 66 so as to function substantially at the ends of the table's strokes. Said cushioning means includes the double acting dash pot provided with the elongated horizontal chamber 195. An adjustable egress valve 196 is provided at each end of the chamber and a check ingress valve 198 is also provided at each end of said chamber. The valves 196 and 198 are preferably formed in the wells 202 and 204 at each end of the chamber. The adjustable egress valve preferably is formed as follows: The upper end of each respective well 202 and 204 is provided with the preferably upwardly extending frusto-conical valve seat 206 near the upper end thereof. The movable member 208 is provided including the thumb screw 210 vertically adjustable in said dash pot casing and having the inner end thereof firmly secured to a member having a frusto-conical valve head 212 adapted to cooperate with the frusto-conical valve seat 206 to be adjustable relative thereto by means of moving the thumb screw 210. It is thus obvious that by adjusting the valve head 212 relative to the valve seat 206 that an adjustable diverging annular discharge passage between said valve seat and valve head is formed discharging into the lower portion of the wells 202 and 204 and into the channel 200 leading from the base of the well 202 to the base of the well 204. The movable portion 214 of said movable member within each respective well is provided with a channel 216 leading from the base thereof and communicating with said channel 200 and discharging upwardly within the center portion of each valve head 212. The thumb screws 210 comprise means operable from without said dashpot to move said movable portion to adjust the position of the valve head relative to the valve seat. The check valve 198 includes the valve seat 215 formed in the upper end of the discharge passage 216 and the valve head therefor comprises the ball 218 preferably constrained to move in a vertical position by the cage 220 also adjustable from without said dashpot and having the screw base 222 provided with the operating slot 224 threadedly adjustable within a portion of said dashpot above said check valve seat 215. If desired the channel 200 may be provided with the supplementary channel 226 communicating with the center portion of the chamber 195. The piston 228 is provided to reciprocate within said chamber 195 and is connected to the valve piston rod 66 to move horizontally in opposite directions simultaneously therewith, by means of the lever 230 pivoted within said casing at 232 and having the power arm 234 attached to an end of said piston rod 66 and the work arm 236 thereof comprising a ball 235 contained within a channel 237 in the center portion of said piston 228. It is thus apparent that as said piston 66 is reciprocated by the movement of the slidable valve through the action of the solenoids 138 and 140 that said piston 228 will be forced simultaneously in opposite directions within said dashpot 195. As said dashpot piston 228 is forced towards the left in the embodiment shown it is obvious that the cushioning fluid namely, preferably oil preferably provided from the reservoir 52 will be forced downwards through the egress valve 196 to the lower portion of the well 202, through the channel 200 into the lower portion of the well 204 and then through the channel 216 therein out through the check valve seat 215 in the upper end thereof and lifting the ball 218 in said opposite well 204 off its seat for discharge of fluid in the right hand end of the chamber from the well 202. It is obvious that on reverse movements of the piston the oil or other cushioning fluid will be forced downwards through the adjustable egress valve 196 in the well 204 and out through the check valve 198 in the well 202. It is also apparent that the speed of the cushioning fluid flow may be varied by varying the adjustment of the opening in the adjustable valve by turning the thumb screws 210 and that by so adjusting the speed of fluid flow in the dashpot in the embodiment shown in Figs. 9–12 particularly the cushioning time interval or dwell between movements of the table in opposite directions may be adjustably varied.

From the foregoing description and the drawings, it is apparent that the various means may be broadly defined and identified as follows: table 26 is a reciprocatable means; piston 46 with its piston rod 47 operating in hydraulic cylinder 48 constitute an unsymmetrical fluid-operated reciprocating means; the reversing valve piston rod 66 is clearly a movable part actuated by the solenoids 138 and 140 which, with their switches 264 and 266 and relay means 142, constitute electrical means broadly; reversing valve piston 66 in its cylinder 64 is a fluid-flow reversing means and with the above electrical means comprises reversal controlling means; table dogs 40 trip the lever 42 and actuate switches 264 and 266 and, as above brought out, broadly are switch means; cushion means 194 attached to valve piston 166 includes a double-action dash-pot with chamber 195 and comprises a means for controlling the speed of reversal; the area of piston rod 47 must be subtracted from piston 46 in one direction to obtain the net effective area, thus causing a lack of hydraulic symmetry, said lack of hydraulic symmetry being generally used to provide a slow-speed working stroke and a high-speed return stroke; valve 80 is a fluid-flow speed control means which determines the speed of the working stroke and hence, normally, also that of the return stroke; pressure-relief valve 90 truly cooperates with the above to determine the maximum acceleration that can be given table 26; table 26 moves over a normal path determined by the position of dogs 40, said table constituting a means to carry work which is acted upon by grinding wheel 28; grinding wheel 28 and table 26 thus respectively constituting means functioning with a reciprocatable means; in combination with the above is the cross feed solenoid 144 controlled by magnetic switch 142 operating to feed the grinding wheel 28 the desired amount forward at the end of each table stroke which broadly constitutes feeding means for the functioning means.

Recapitulating: a single fluid-flow speed control means 80 is provided for the unsymmetrical fluid-operated reciprocating means 46, 47 and 48 which operates table 26 slowly during its working stroke in one direction and rapidly on its return stroke in the other direction; table 26 governs its own reversal by dogs 40 operating electric switch means 142 at the opposite ends of its normal path; pressure-relief valve 90 effects the maximum amount of dwell of table 26 during its reversals depending somewhat upon the position of the fluid-flow speed control means 80; during this dwell, the solenoid-operated feeding means 144 is operated to feed grinding wheel 28 towards the work carried on table 26; cushioning means 194 controls the rate of operation of reversing valve 66 independently in opposite directions, reversing valve 66 being operated by solenoids 138 and 140, to give the desired shockless reversal of reciprocating means 26. Thus from the résumé contained in this, and the preceding paragraph, it is apparent that all of the above-mentioned means work together in true combination for the achievement of a shockless reversal of a work-carrying table, reciprocated over a normal path by an unsymmetrical fluid-actuated means (by individually adjusting the dwell at the opposite ends of the path) and the feeding of work-removing means toward the work during the periods of dwell thus provided.

As stated we also provide an automatic oiler 240 for oiling the ways 24 of the table shown in more detail in Figs. 2, 10 and 11. Said oiler 240 includes the chamber 244 suitably fed by the pipe 246 connected to the discharge pipe 78 in said fluid system. Said chamber is preferably provided with one or more drip holes 248 leading to the pipes 250 which discharge in the respective ways 24. Between said drip holes 248 and pipes 250 we preferably provide the sight drip gauges 252 provided with transparent sides so that the amount of oil dripping therethrough may be visible from without. We also provide manually adjustable means for adjustably closing said drip holes 248 from without comprising the thumb screws 254 having pointed ends adjustable within said drip holes 248 by means of the heads 256 operable from without said casing 244, said thumb screws 254 being threadedly adjustable in holes in the top wall of the casing for said chamber 244.

As stated hitherto, we preferably control the reciprocation of the reciprocatable means by suitable electric means and in our preferred embodiment preferably provide a suitable electric circuit with the connections about to be described for moving the slidable valve 58 to reciprocate this reciprocatable means. The embodiment of the electrical circuit for actuating the valve 58 in the embodiment shown (in Figs. 1-8) is diagrammatically illustrated in two positions in Figs. 3 and 4 and the electrical circuit for actuating the preferred embodiment of our invention shown in Figs. 9-13 is diagrammatcally illustrated in Figs. 12 and 13. In general the embodiments of these two inventions are similar, the embodiment of the invention shown in the electrical circuit shown in Figs. 12 and 13, comprising a few specific improvements over that shown in Figs. 3 and 4. We provide the solenoids 138 and 140 for controlling the movement of the reciprocatable means or table 26 in each of the specific embodiments by specifically controlling the valve 58 for controlling the reciprocating means 46, 48 for reciprocating the reciprocatable means or table 26. As also stated we provide means mounted on said machine independently of the reciprocatable means and table 26 such as the grinding wheel or tool 28 to function with said reciprocatable means. As stated we also provide means for feeding said functioning means relative to the reciprocating means, namely the pawl and ratchet connection 10 hitherto described and we provide electrical means for moving the feeding means in the direction to feed the functioning means or grinding wheel 28 relative to the work on the reciprocatable means 26. A cut-out switch 143 may be provided ahead of solenoid 144 so that cross feed mechanism may be worked manually or otherwise independently of the electric circuit. In our preferred embodiment we provide an electric circuit 260 for actuating said electrical means, namely the solenoids 138 and 140 for controlling the valve and the solenoid 144 for advancing the feeding means for the grinding wheel. Said electrical circuit preferably includes the magnetic switch 142 for alternatively operating the reciprocatable means solenoids 138 and 140 and simultaneously actuating said functioning means actuating solenoid 144 and we also provide switch means 42 automatically actuated by the reciprocatable means or table 26 for actuating said magnetic switch 142 to actuate one of the slidable valve solenoids 138 or 140.

Said switch means 42 includes the operating lever 262 suitably pivoted in opposite directions by means of the dogs 40 and adapted when pivoted to the right to close the switch 264 connected to the electrical circuit 260 and when pivoted in the opposite direction to close the switch 266 connected to the electric circuit 260. In the embodiment shown in Figs. 3 and 4 said switches 264 and 266 are held down by the position of the operating lever 262 so long as it is held by either one of the opposite disposed dogs. When either dog draws away from the operating lever 262 the weight 268 will immediately operate to draw the operating lever 262 to a vertical position away from the contacting switches 264 or 266 and as the switches 264 and 266 are normally forced to open position by the springs 270, they will immediately function to break the circuit when the operating lever is drawn away from it.

For ease of description we will divide the main circuit 260 into various supplemental divisions. The magnetic switch 142 is operated by the solenoids 272 and 274 which in turn alternately actuate the ends of the rod 276 to draw it in opposite directions. The rod 276 is also provided with the oppositely disposed sets of two contact plates 278 and 280 respectively mounted thereon. The circuit 260 may be conveniently divided for purposes of description into the main line 282 which supplies the necessary current for operating the various parts of the circuit and is suitably connected to the various subcircuits in a manner to cause their operation. In Figs. 3 and 12 we have shown in full lines the circuits which are actuated at the completion of the movement of the table 26 to the right to cause the functioning of the valve 58 to start the movement of the table to the left and we have shown in Figs. 4 and 13 the table at the end of its completion of its stroke to the left and actuating the circuit to start the actuation of the valve 58 to cause the movement of the table to the right. The switch circuit 264' which is completed when the operating lever 262 has closed the switch 264 is connected to the main circuit 282 so as to actuate the solenoid 272 to pull the armature 276 towards the right as shown in Figs. 3 and 12 to move the sets of contact plates 278 to the right to complete a circuit from the main line 282 through the line 138' for actuating the solenoid 138 for pulling the piston rod 66 to the right to start pushing the table 26 to the left and to also energize the circuit 144' which is suitably connected through suitable contacts by suitable tie-ins in the magnetic switch to the main line 282 to energize the solenoid 144 simultaneously with the energization of the solenoid 138 to energize the plunger 146, to suitably actuate the feeding mechanism to feed the grinding wheel forward the desired amount by means of the plunger 146. When the left hand dog 40' is moved away from the operating lever 262 the operating lever will pivot to a vertical position, thereby permitting the automatic opening switch 264 to open breaking the circuit 264' and thus cutting off the current to the solenoid 272, the contact switch plate 278 being pulled to a neutral position by means of the weight 279 thus breaking the circuit to the solenoid 138 and solenoid 144. We have shown in Figs. 4 and 13 what takes place at the end of the opposite movement of the table 26. As the table 26 completes its stroke towards the left it is obvious that the dog 40'' will knock the operating lever 262 over towards the left to complete the circuit 266' shown in full lines in Figs. 4 and 13 which in turn will actuate the solenoid 274 to draw the magnetic switch rod 276 to the left from its neutral position and so that the opposite set of plates 280 thereof may close a circuit to form a circuit from the main circuit 282 through the circuit 140' for operating the solenoid 140 to energize the solenoid 140 to move the piston 66 to the left to move the valve 58 to start the movement of the table again to the right and simultaneously energize the solenoid circuit 144' to feed the tool the desired amount forward during the dwell at this period of the reciprocation cycle by means of the solenoid 144 and plunger 146 actuating the feeding mechanism heretofore described. It is also apparent that when the dog 40'' is moved away from the operating lever 262 that the operating lever 262 will then swing to a neutral position permitting the switch 266 to open and permitting the weight 279 to draw the magnetic switch rod 276 to neutral position again drawing the switch plates 280 away from their contacts to simultaneously cut off the circuits 140' and 144'. The embodiment shown in Figs. 12 and 13 differs in certain respects from the embodiment shown in Figs. 3 and 4 for the switches 264 and 266 operate to energize their respective circuits 264' and 266' to energize the respective solenoids 272 and 274 of the main magnetic switch 142 to move it alternately opposite the desired direction. We have found in practice, however, that it is not desirable to keep the various circuits energized for any longer period than is necessary for actually reversing the valve, particularly in case the table should stop while in reversing position. If the table stops in reversing position in the embodiment shown in Figs. 3 and 4 the current would be apt to burn out the solenoids. In the embodiments shown in Figs. 12 and 13, however, this is positively prevented for as soon as the solenoids 138 and 140 have respectively been energized to move the valve piston 66 the desired amount they will abut the switches 284 and 286 respectively which will function in the reverse manner to the switches 264 and 266 to automatically break the circuits when contacted by the ends of the reciprocating piston 66 after it has changed in position in the desired manner to completely deenergize respectively both the solenoid operating circuits 138' and 140' and the traverse mechanism operating solenoid circuit 144' as soon as the valve piston 66 has shifted its position. This has the additional advantage of enabling the operative to know in which direction the table is heading if desired to start up near the end of a stroke. The switches 124 for cutting off the current in the main line 260 have already been described.

As stated hitherto we also provide in an electrical circuit for controlling the reciprocation of the reciprocatable means 26, limit switches 290 located in said circuit preferably spaced beyond the normal path of the movement of said reciprocatable means 26 and adapted to break said circuit 260 when for any reason the table 26 or other reciprocatable means employed passes beyond the normal limit of reciprocation thereby forming a safety device for completely shutting off the electric actuating circuit if the table should go beyond its desired path of reciprocating travel. Said switches are connected to the main line 260 in any suitable manner and preferably are of the self closing or self-opening type shown in switches 264 and 266.

It is understood that our invention is not limited to the specific construction shown and that various deviations may be made therefrom without departing from the spirit and scope of the appended claims.

What we claim is:

1. In a machine tool, in combination, reciprocatable means, fluid-operated means for reciprocating said reciprocatable means, means mounted on said machine independently of said reciprocatable means to function with said reciprocatable means, one of said means being adapted to carry work and the other to act upon said work, means for feeding said functioning means relative to said reciprocatable means and electrical means adapted to be actuated by said reciprocatable means at substantially the ends of the reciprocatable means strokes for controlling the reversal of said fluid-operated reciprocatable means and for moving said feeding means to simultaneously reverse the direction of reciprocation and to feed said functioning means.

2. In a machine tool, in combination, reciprocatable means, a fluid system including fluid operated means for reciprocating the reciprocatable means, a uni-directional pump for supplying fluid to said reciprocating means, a slidable valve for reversing the flow of fluid to said reciprocating means operable to change the direction of circulation of fluid in said system to alternately move said reciprocatable means in opposite directions, two solenoids for actuating said valve alternately in opposite directions, means mounted on said machine independently of the reciprocatable means to function with said reciprocatable means, one of said means being adapted to carry work and the other to act upon said work, means for feeding said functioning means relative to the reciprocatable means, a solenoid for moving said feeding means in a direction to feed the functioning means, an electric circuit for actuating said solenoids including a magnetic switch for alternately operating the said valve actuating solenoids and simultaneously actuating said functioning means actuating solenoid, switch means automatically actuated by the reciprocatable means for completing the circuit to simultaneously actuate said magnetic switch to actuate a slidable valve actuating solenoid and said functioning means solenoid at substantially the ends of the reciprocatable means strokes, and switch means actuated by the valve at substantially the completion of its change of position to break said circuit.

3. In a machine tool, in combination, reciprocatable means, reciprocating means therefor, fluid-operated system means for reciprocating said reciprocatable means including a uni-directional pump, valve means to reverse the fluid flow to reverse the direction of motion of said reciprocating means, electromagnetic means having a movable part operatively connected to said fluid flow reversing valve, means for controlling said reversal, and switch means connected to said electromagnetic means and adapted to be actuated by said reciprocatable means at substantially the ends of the reciprocatable means strokes to actuate said electrical control means to reverse the direction of fluid flow and hence of reciprocation.

4. In a machine tool, in combination, reciprocatable means, reciprocating means therefor, electromagnetic means having a movable part for controlling the reversal of said reciprocating means, switch means electrically connected to said electromagnet means and electrically actuated by said reciprocatable means at substantially the ends of the reciprocatable means strokes to actuate said electromagnetic means movable part to reverse the direction of reciprocation and means cooperating with said movable part to control the speed thereof to determine the duration of dwell during reversal.

5. In a machine tool, in combination, reciprocatable means, reciprocating means therefor, solenoid means having a movable part for controlling the reversal of said reciprocating means, switch means electrically connected to said solenoid means and actuated by said reciprocatable means at substantially the ends of the reciprocatable means strokes to electrically actuate said solenoid means to reverse the direction of reciprocation, and an adjustable dashpot means cooperating with said movable part to adjustably control the speed thereof to determine the duration of dwell during reversal.

6. In a machine tool, in combination, reciprocatable means, means mounted on said machine independently of said reciprocatable means to function with said reciprocatable means, one of said means being adapted to carry work and the other to act upon said work, means for feeding said functioning means relative to said reciprocatable means, electrical means including a circuit for controlling the reversal of said reciprocatable means and for moving said feeding means, said electrical means having a movable part, current-actuated means for actuating said electrical means electrically connected by said circuit to said electrical means, switch means connected to said current-actuated means and actuated by said reciprocatable means at substantially the ends of the reciprocatable means normal strokes to initiate current through said current-actuated means to actuate said electrical means to reverse said reciprocatable means and means to shut off said electric current actuated by said first-mentioned electrical means movable part after completion of its movement effecting reversal of said reciprocatable means, and means cooperating with said movable part to control the speed thereof to determine the duration of dwell during reversal, whereby said feeding means may be completely actuated during said dwell, and limit switches in said circuit spaced beyond the normal strokes of said reciprocatable means adapted to break said circuit to stop any abnormal motion of said reciprocatable means.

7. In a machine tool, in combination, reciprocatable means, means mounted on said machine independently of said reciprocatable means to function with said reciprocatable means, one of said means being adapted to carry work and the other to act upon said work, means for feeding said functioning means relative to said reciprocatable means, electrical means for controlling the reversal of said reciprocatable means and for moving said feeding means, said electrical means having a movable part, switch means connected to said electrical means and actuated by said reciprocatable means at substantially the ends of said reciprocatable means strokes to actuate said electrical means to simultaneously feed said functioning means and to reverse said reciprocatable means, and means cooperating with said movable part to control the speed thereof to determine the duration of dwell during the reversal of said reciprocatable means, whereby said feeding means may be completely actuated during said dwell.

8. In a machine tool, in combination, reciprocatable means, reciprocating means therefor, electromagnetic means having a movable part for controlling the reversal of said reciprocating means, current-actuated means for actuating said electromagnetic means electrically connected to said electromagnetic means movable part, switch means connected to said current-actuated means and electrically actuated by said reciprocatable means at substantially the ends of the reciprocatable means strokes to initiate current through said current-actuated means to actuate said electromagnetic means movable part, to reverse said reciprocating means and means to shut off said electric current actuated by said first-mentioned electromagnetic means movable part after completion of its movement effecting reversal of said reciprocating means.

9. In a machine tool, continuously reciprocatable means, means mounted on said machine independently of the reciprocatable means to function therewith, one of said means being adapted to carry work and the other of said means being adapted to act upon said work, a hydraulic system for reciprocating said means, an electric circuit for controlling said hydraulic system, and means operative to by-pass the fluid in said system to stop said reciprocatable means at any desired point in its reciprocation cycle and simultaneously cut off the current in said electric circuit.

10. In a machine tool, in combination, reciprocatable means, fluid-operated means for reciprocating said reciprocatable means including means to reverse the fluid flow to reverse the direction of motion of said reciprocating means, electromagnetic means having a movable part operatively connected to said fluid-flow reversing means for controlling said reversal and switch means electrically connected to said electromagnetic means and adapted to be electrically actuated by said reciprocatable means at substantially the ends of the reciprocatable means strokes to actuate said electromagnetic control means to reverse the direction of fluid flow and hence of reciprocation.

11. In a machine tool, in combination, reciprocatable means, fluid-operated means for reciprocating said reciprocatable means including means to reverse the fluid flow to reverse the direction of motion of said reciprocating means, electrical means having a movable part operatively connected to said fluid flow reversing means for controlling the reversal of said fluid-operated reciprocatable means, switch means connected to said electrical means and adapted to be actuated by said reciprocatable means at substantially the ends of the reciprocatable means strokes to actuate said electrical means to reverse the direction of fluid flow and hence of reciprocation, and means cooperating with said movable part to control the speed thereof to determine the duration of dwell during reversal of said reciprocal means.

12. In a machine tool, in combination, reciprocatable means; fluid-operated system means for reciprocating said reciprocatable means including a uni-directional pump, valve means to reverse the fluid flow to reverse the direction of motion of said reciprocating means, means to vary the speed of fluid flow, and a pressure-relief valve releasable on an excess pressure in said system; electrical means having a movable part operatively connected to said fluid flow reversing valve, means for controlling said reversal, switch means connected to said electrical means and adapted to be actuated by said reciprocatable means at substantially the ends of the reciprocatable means strokes to actuate said electrical control means to reverse the direction of fluid flow and hence of reciprocation and a unitary manually controlled by-pass and switch means for interrupting the flow of fluid through said system to stop said reciprocatable means at any desired portion of its reciprocation cycle and simultaneously shut off the current in said electric means.

13. In a machine tool in combination reciprocatable means, piston and cylinder fluid-operated means having different effective areas at opposite ends thereof for reciprocating said reciprocatable means including means to reverse the fluid flow to reverse the direction of motion of said reciprocating means, solenoid means having a movable part operatively connected to said fluid flow reversing means for controlling the reversal of said fluid-operated reciprocatable means, switch means connected to said electrical means and adapted to be actuated by said reciprocatable means at substantially the ends of the reciprocatable means strokes to actuate said electrical means to reverse the direction of fluid flow and hence of reciprocation, and means cooperating with said movable part adjustable to control the speed thereof in each direction during reversal of said reciprocatable means to compensate for said difference of effective areas of said piston and cylinder means.

14. In a machine tool, in combination, reciprocatable means, piston and cylinder fluid-operated means having different effective areas at opposite ends thereof for reciprocating said reciprocatable means including means to reverse the fluid flow to reverse the direction of motion of said reciprocating means, means to vary the speed of fluid flow and a pressure-relief valve releasable on an excess pressure in said system; electrical means including a circuit and having a movable part operatively connected to said fluid-flow reversing means for controlling the reversal of said fluid-operated reciprocatable means over a normal path, means mounted on said machine independently of said reciprocatable means to function with said reciprocatable means, one of said means being adapted to carry work and the other to act upon said work, means for feeding said functioning means relative to said reciprocatable means; switch means connected to said electrical means and adapted to be actuated by said reciprocatable means at substantially the ends of the reciprocatable means strokes to simultaneously actuate said feeding means and said electrical means to reverse the direction of fluid-flow and hence of reciprocation, and means cooperating with said movable part adjustable to control the speed thereof in each direction during reversal of said reciprocatable means to compensate for said difference of effective areas of said piston; and a manually controlled by-pass for interrupting the flow of fluid through said system to stop said reciprocatable means at any desired portion of its reciprocation cycle and simultaneously shut off the current in said electric means; and limit switches in said circuit spaced beyond the normal path of said reciprocatable means adapted to break said circuit to stop any abnormal motion of said reciprocatable means.

15. In a machine tool, in combination, reciprocatable means, reciprocating means therefor, a permeable core, two oppositely disposed solenoids co-actable therewith, each for controlling the reciprocations of said reciprocating means in its respective direction, an electric circuit to actuate said solenoids including a magnetic switch for alternately operating said solenoids, switch means automatically actuated by said reciprocatable means for completing the circuit to actuate said magnetic switch to electrically actuate the respective one of said solenoids at substantially the ends of the reciprocatable means strokes, and switch means actuated by said solenoid operated core at substantially the completion of each change of its position to break said circuit.

16. In a machine tool organization the combination of a support, a member translatable thereover, hydraulic means for effecting said translation including a hydraulic medium and a conduit therefor, a reversing valve for controlling the direction of flow of the medium through the conduit, magnetic means for effecting the reversal of the valve, a reversing lever pivotally mounted on the support operable by the table, and means operable by the lever for energizing the magnetic means.

GEORGE T. HUXFORD.
FRANK E. STRATTON.
PAUL G. HEINEMANN.

CERTIFICATE OF CORRECTION.

Patent No. 2,021,066.                                                November 12, 1935.

GEORGE T. HUXFORD, ET AL.

It is hereby certified that error appears in the printed specification of the above numbered patent requiring correction as follows: Page 3, second column, line 73-74, for "contiuously" read continuously; page 5, first column, line 11-12, for "effects" read affects; line 23, for "résumé" read resumé; and line 66, for "diagrammatcally" read diagrammatically; page 7, second column, line 41, claim 8, strike out the words "movable part" and insert the same after "means" in line 40, same claim; and that the said Letters Patent should be read with these corrections therein that the same may conform to the record of the case in the Patent Office.
Signed and sealed this 8th day of September, A. D. 1936.

Leslie Frazer (Seal)                                          Acting Commissioner of Patents.